Dec. 10, 1940.  R. B. WHEELAN  2,224,579
POSE REFLECTING PHOTOGRAPHY
Filed March 28, 1935  2 Sheets-Sheet 2
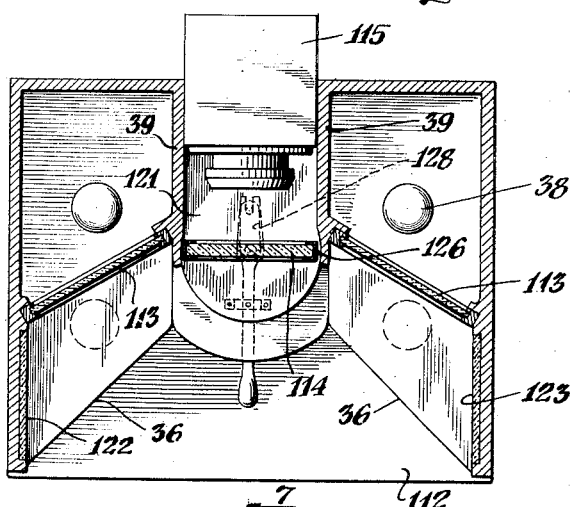
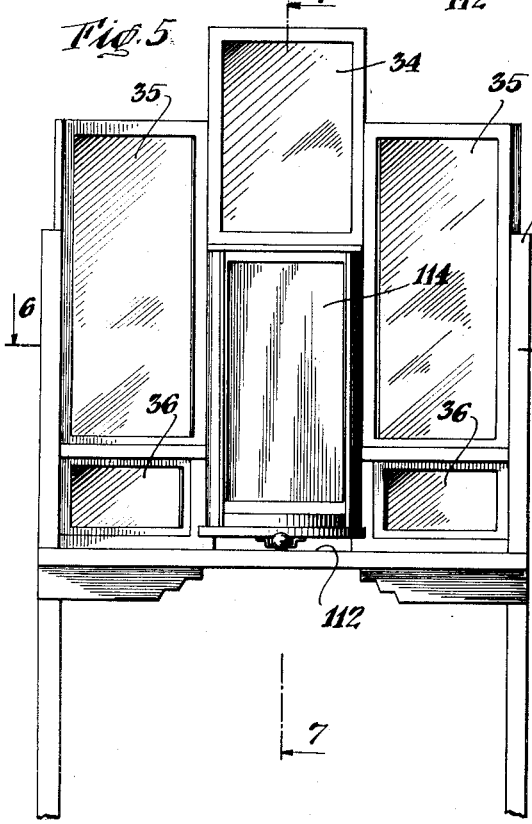
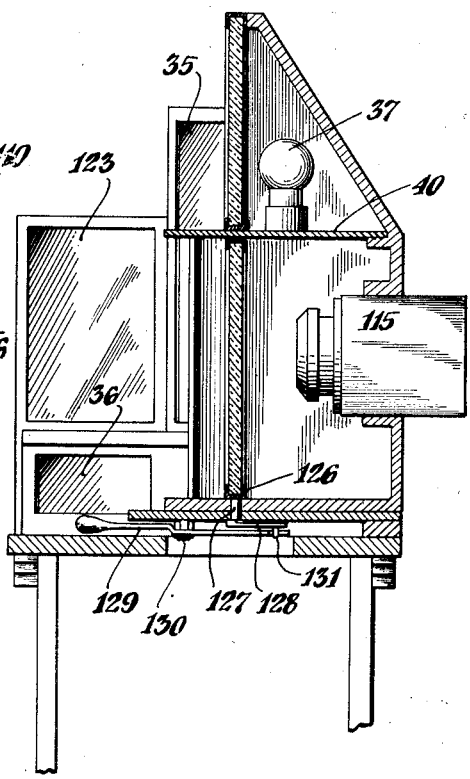
INVENTOR
Robert B. Wheelan
BY
Watson Bristol Johnson Leavenworth
ATTORNEYS Patented Dec. 10, 1940

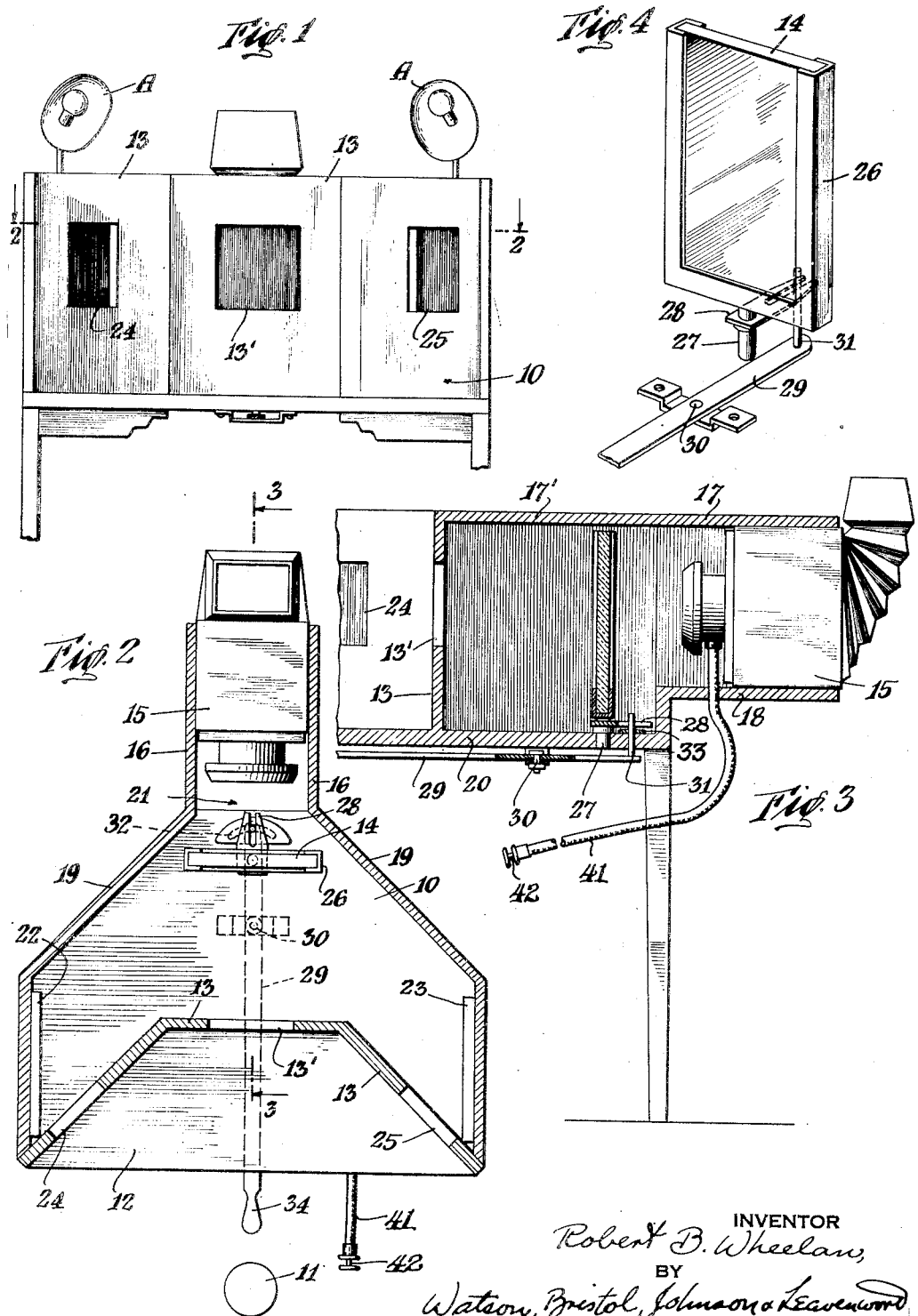

2,224,579

UNITED STATES PATENT OFFICE 2,224,579

POSE REFLECTING PHOTOGRAPHY

Robert B. Wheelan, Great Neck, N. Y.

Application March 28, 1935, Serial No. 13,536

15 Claims. (Cl. 88—74)

This invention relates to pose reflecting photographic apparatus of the kind wherein a posing subject can see his reflection at the time his latent image is recorded. The present application is a continuation in part of my copending application, Serial No. 756,589, filed December 8, 1934.

A general object of the invention is to provide an improved form of photographic apparatus involving a light pervious reflector by means of which the posing subject can view his image, and through which light may pass from the subject to the camera and to do so without disclosing the camera or its lens to the view of the posing subject.

Other objects of the invention are to provide a pose reflecting apparatus which is structurally simple, easy to operate, has a minimized number of movable parts, and which affords a clear and continuous reflecting surface which need not be moved or otherwise disposed of during the taking of a photograph.

A more specific object of the invention is to provide a pose reflecting photographic apparatus having a transparent mirror, in which means is provided for enhancing the apparent reflecting power of such mirror while permitting light to pass therethrough from a posing subject to the camera.

Another object of the invention is to provide an improved apparatus which can be used to advantage in the taking of self posed pictures.

Other objects of the invention will in part be obvious and will in part appear hereinafter.

The invention accordingly comprises the features of construction, combinations of elements and arrangement of parts which will be exemplified in the following detailed disclosure and the construction therein set forth, and the scope of the application of which will be indicated in the claims.

For a fuller understanding of the nature and objects of the invention reference should be had to the following detailed description taken in connection with the accompanying drawings, in which:

Fig. 1 is a fragmentary front elevation of a structure simulating a dressing table and equipped with apparatus embodying features of the present invention;

Fig. 2 is a horizontal sectional view taken substantially along line 2—2 of Fig. 1;

Fig. 3 is a fragmentary vertical sectional view, on an enlarged scale, taken substantially along line 3—3 of Fig. 2;

Fig. 4 is a fragmentary perspective view showing a detail of the construction;

Fig. 5 is a fragmentary front elevation of another form of structure simulating a dressing table and equipped with apparatus embodying features of the present invention;

Fig. 6 is a horizontal sectional view taken substantially along line 6—6 of Fig. 5; and Fig. 7 is a vertical sectional view taken substantially along line 7—7 of Fig. 5.

Heretofore photographic equipment has been provided wherein some arrangement is made to enable the poser to see his reflection at or just prior to the time the picture is taken. These previous arrangements have involved the use of one or more mirrors, at least one of which is usually located between the camera and the posing subject. In order to take the picture with such equipment, it was necessary to provide an aperture in the mirror, through which the lens is visible to the poser, for the passage of light from the poser to the camera, or else to provide some mechanical device for removing the mirror prior to the recording of the photograph. Sometimes a combination of the aperture and moving mechanism was resorted to. As a consequence, there was an interruption in the reflecting face of the mirror, due to the light passing aperture, which impaired its usefulness in posing the subject, or else there was a movement of the mirror after the subject was posed and prior to the taking of the photograph. Such movements of the mirror or visibility of the camera lens are undesirable in distracting the attention of the subject and causing his pose to become self-conscious.

In accordance with the present invention, drawbacks such as those mentioned are obviated and improved results are obtained through provision of a transparent or light pervious reflector which is located in the path of light passing between the posing subject and the camera, and by means of which the subject can see his reflected image and not the lens or camera, but through which light may pass from the subject to the camera. Such a reflector presents a continuous uninterrupted reflecting surface and need not be moved during the taking of the photograph.

Referring more particularly to the drawings, there is shown a cabinet 10, before which a posing subject may sit at a fixed location designated 11. The cabinet may be of any suitable design, subject to the mechanical requirements hereinafter described, and in the present case is illustrated as having the general characteristics of a dressing table having a table portion 12 at the usual elevation and an apertured, vertical, sectional, front wall 13 through which the mirror equipment about to be described may be viewed by a poser when in seated position. The cabinet is adapted to be supported at a convenient height by legs or other suitable understructure.

The central portion of wall 13 has an aperture 13' through which the poser at 11 may view his full face image in a reflector 14. A camera 15 is located behind this reflector in position to focus on the spot 11 through the aperture 13' and through the reflector. If desired, the camera may be placed in any other position, so long as means (such as supplemental mirrors) are provided to direct the path of light from the poser through the reflector to the camera lens, and so long as the camera is concealed from the subject.

The reflector 14 is made from a continuous, or imperforate sheet of clear glass, and has unidirectional transparency in the sense that it is largely pervious to light passing from the poser to the camera, although preferably not sufficient transparency to enable the poser to see the camera lens through it when he is facing light, as from the illuminating sources A—A, and the lens is in shadow. This quality may be given the reflector in any suitable manner, as by lightly coating the rear reflecting surface with pure silver, a mercury and silver amalgam, or with any other known or desired reflective coating. The amount of the coating is controlled, however, as for example by curtailing the time the reflector glass is subjected to the silver depositing solution, and the glass is only slightly silvered. Good results for the purposes of the present invention are obtained, in the arrangement shown, with a glass which is lightly coated so as to give about 20% reflection under ordinary circumstances. This permits a ready passage of light from the sitter to the camera, and such light as is cut off by the reflector may be compensated for by varying the time of exposure of the film in the camera. It is contemplated that any suitable form of transparent mirror may be utilized, regardless of the particular process employed to produce it.

While, as stated, a lightly silvered glass having about 20% reflecting power is suitable, this degree of reflection is not regarded as being critical and the degree of relative transparency or opaqueness of the reflector be varied within wide limits, so long as the amount of light cut off is not so much as seriously to impair the functioning of the camera or to require an unduly long exposure.

An important further feature of the present arrangement resides in the provision of means for enhancing the apparent reflecting power of the transparent reflector 14. To this end the cabinet structure 10 is extended rearwardly to provide side walls 16 and top and bottom walls 17 and 18 which embrace the camera so snugly as to prevent the infiltration of light therearound. In addition to the front wall 13, the cabinet 10 also has opaque side walls 19 and a bottom wall 20 and top wall 17' which may, as shown, be a forward continuation of the top wall of the camera accommodating extension. By this means the area behind the reflector 14, designated generally at 21, is darkened, the only access for light to the interior of the cabinet being through the forwardly disposed apertures, such as 13'. This darkening of the area 21 behind the reflector materially increases its reflecting effect as viewed from the spot 11, there being no passage of light from behind the camera to the poser, so that to the latter, the effect is just the same as though the light silver coating were backed up by a heavy opaque coating. To this end the exclusion of light from the area 21 is made as absolute as is practically commensurate with the provision of the apertures such as 13'. This cutting off of the passage of light from behind the reflector to the poser so enhances the reflecting properties of the reflector glass that some of the advantages of the invention may be obtained even by using a plain uncoated transparent glass plate as a reflector, in combination with means such as that described for darkening the space behind it and between it and the camera.

Accordingly, it is to be understood that throughout the present specification and claims, terms such as "transparent reflector" or "light pervious reflector" are intended, wherever the context permits, to refer to a reflecting glass or mirror which may be silvered to the maximum extent indicated in the description above, or which may be entirely unsilvered, if combined with a darkening means, or which may have any desired amount of silvering or other reflecting coating between such limits.

As thus far described, the transparent reflector 14 is adapted directly to face the poser at 11 in order that he may see his full face reflection therein. Means also are provided to allow the poser to see a profile view. This means comprises lateral mirrors 22 and 23 which are disposed within the interior of the cabinet 10 in position to be viewed through apertures 24 and 25 respectively. In order that the central mirror may cooperate with either of these lateral mirrors in turn, it is mounted for swinging movement about a vertical axis.

This mounting includes a frame 26 in which the reflector 14 may be slidably and removably fitted. The frame is fixedly mounted on a vertical spindle 27 which is rotatably journaled in the bottom wall 20 of the cabinet. A rearwardly extending slotted plate 28 is fixed to the spindle 27. A lever 29 is pivoted at 30 to the underside of the cabinet and has at its rearmost end an upright pin 31 which projects through an arcuate slot 32 into the interior of the cabinet and into the slotted portion of plate 28. The arcuate slot 32 is concentric with pivot 30 and snugly but slidably receives pin 31, which latter carries with it a slidable light excluding shield 33 in order that the area 21 may not be illuminated by light entering through slot 32. The lever 29 extends forwardly and terminates in a manually operable handle 34 which is conveniently located so as to be reached by the poser at spot 11.

As will be readily understood from the above description, the poser may look through one of the openings, such as 24, into the mirror 22, thus presenting his image in profile or three-quarter view to the reflector 14. By movement of the handle 34, the poser may swing reflector 14 toward the mirror 22 until the angles of incidence and reflection at reflector 14 are such as to bring the poser's image back into his own view through double reflection from the reflector 14 and the mirror 22. He will then see his image in the same or substantially the same aspect which is presented to the lens for depiction. An opposite profile view may be seen through similar cooperative functioning of the reflector 14 and the mirror 23.

The light passing from the sitter to the camera, and to which the plate or film in the camera is exposed, is passed through the transparent reflector 14 whether a profile or full face view is being taken.

After the subject is suitably posed, as indicated by his reflection, the actual opening of the shutter in the camera may be effected by an attendant, or by the poser himself, a suitable extension control being provided if the latter kind of operation is desired. The extension control, conveniently located with respect to the position of the poser as indicated in Fig. 2, may comprise a flexible conductor or sleeve 41 leading to the shutter assembly and carrying a flexible cable adapted to be moved longitudinally in the conductor to release or operate shutter mechanism when a plunger 42 fixed to the end of the cable and projecting from the end of the conductor is depressed by the poser.

In Figs. 5, 6 and 7, there is shown a different form of dressing table cabinet structure which has the transparent mirror feature of the above-described equipment, but in which such mirror and the lateral profile mirrors are arranged in the open instead of being deeply encased within the cabinet. With such an arrangement, the amount of light illuminating the subject and reflected among the several mirrors is seemingly increased, there being available not only a given amount of direct illumination but considerable reflected light as well, due to the presence of a number of exposed mirrors.

The form of cabinet about to be described also has an improved arrangement of built-in lights, which effectively illuminate the posing subject, especially in the presence of the several exposed mirrors, so that the subject not only is illuminated so as to be presented to advantage for photographic purposes, but is also presented with a clear, well-illuminated mirrored reflection due to the presence of direct and reflected light. These lights also are so juxtaposed to the transparent reflector as to make it more difficult for anyone facing them to see through the latter, thus enhancing the apparent reflective power as well as the camera concealing function of such mirror.

The structure involves a cabinet 110 having a front dressing table portion 112 located at a suitable height to accommodate a sitting poser. The cabinet has front walls 34 and 35, the latter, in the present illustrative embodiment, extending obliquely from and being disposed laterally of the wall 34. Additional front walls 36 are located forwardly of walls 35 and are also preferably disposed obliquely. All of the named front walls are made either entirely or in part in the form of translucent glass panels, behind which are arranged lights such as those indicated at 37 and 38, for the purpose of illuminating the poser and for facing the poser with lights which act to prevent his seeing through the transparent reflector. Especially good results for picture purposes are obtained by illuminating the surface at 34 to a relatively high value, and illuminating the side surface at 35 to a lesser degree. The forwardly disposed illuminated surfaces at 36 are the lowest in intensity among the three sets of lights employed and are arranged to soften the deep shadows beneath the chin and at the neck of a poser seated before the present type of apparatus, as well as to impart attractive "catchlights" to the poser's eyes.

The mirror equipment comprises a transparent mirror 114, similar in its light reflecting and transmitting properties to the mirror described in the first form. This transparent mirror is mounted in a suitable rotatable frame 126 which in turn is mounted on a spindle 127 having a slotted plate 128 projecting rearwardly from its lower end. An operating handle 129 is pivoted at 130 and has a pin 131 extending into the slot of plate 128 in order to enable the poser to adjust the transparent mirror to a suitable angle for cooperation with lateral mirrors when a profile view is wanted. These lateral mirrors are designated 122 and 123, and are shown as being parallel with each other and fixedly located at opposite sides of the cabinet just forwardly of the front wall surfaces 113. The several mirrors 114, 122 and 123 are located substantially entirely in the open, and are so positioned with reference to the illuminating sources 34, 35 and 36 as to provide clear well-illuminated reflections.

A camera 115 is located in the rear of the cabinet in the path of light passing from the poser through the transparent mirror. This camera is snugly fitted into the rear wall of the cabinet so that light cannot filter around its sides into the space 121 located between the camera lens and the transparent mirror. This space is further walled from the illuminating chambers by suitable interior partitions or walls such as side walls 39 and a top wall 40 so that the space 121 is maintained in a darkened condition in order to enhance the seeming reflecting power of the transparent mirror.

The operation of posing and photographing the subject is the same with the second form of cabinet as with the first. With both forms of cabinet the camera is hidden from the view of the posing subject so that the latter can observe his pose as seen from the camera without being made camera-conscious.

It will be seen that by means of the described invention the poser may readily view his reflected image at the time his photograph is taken, and that the provided reflecting means need not be apertured or moved. Adequate means is provided for securing a full and clear reflected image, and this, together with the elimination of the previously used aperture, or of the previously used mechanism for removing or reciprocating the mirror, among other described advantages, affords a device which is admirably suited to fulfil the intended objects of the invention.

Since certain changes in carrying out the above process and in the constructions set forth, which embody the invention may be made without departing from its scope, it is intended that all matter contained in the above description or shown in the accompanying drawings shall be interpreted as illustrative and not in a limiting sense.

Having described my invention, what I claim as new and desire to secure by Letters Patent is:

1. Pose reflecting photographic apparatus comprising, in combination, a camera, a transparent reflector positioned in the path of light between said camera and a posing subject, and a walled cabinet structure snugly embracing said camera and extending forwardly from said reflector to cut off the passage of light from behind the reflector to the subject.

2. Pose reflecting photographic apparatus comprising, in combination, a camera, a walled cabinet structure snugly embracing and extending forwardly from said camera, and a transparent reflector mounted in said structure in the path of light from a posed subject to said camera, said structure having an opening to permit the passage of said light from said posed subject to and through said reflector, the walls of said structure being arranged to cut off the passage of light from behind the reflector to the subject.

3. Pose reflecting photographic apparatus comprising, in combination, a camera, a walled cabinet structure, and mirror means which comprise a light-transmitting reflector having a reflecting material forming a partly-transparent mirror positioned between said camera and a posing position in front of the apparatus and movably mounted in said structure so that its reflecting surface may be turned to the right and left; said mirror means being so arranged and oriented as to reflect back to the posing position a portion of light passing from a posing subject toward said camera and to permit the subject to view his reflected image directly in said reflector, or indirectly through other mirrors; said structure having walls so positioned with respect to edges of said movable reflector as to cooperate therewith in shielding said camera and parts thereof from the view of the posing subject, and additional walls cooperating with the first-mentioned walls and the camera to cut off passage of light from behind said reflector past the camera to the subject.

4. Pose reflecting photographic apparatus comprising, in combination, a portable cabinet structure generically of customary design, a camera located therein, a light-transmitting reflector located between said camera and a posing position in front of the apparatus to permit a subject to view his reflected image directly therein and movably mounted in said structure so that its reflecting surface may be turned to the right and left, a plurality of mirrors mounted in said structure on opposite sides of a path of light from the posing position to said camera to cooperate with said reflector when turned to the right or left to permit the subject to view his reflected image in the latter indirectly through said mirrors, a forwardly facing translucent panel comprising a part of a front wall of said structure, illuminating means located behind said panel to cast light through said panel to the posing position so as to illuminate a posing subject in front of the reflector; said structure having walls so positioned with respect to the edges of said movable reflector as to cooperate therewith in shielding said camera and parts thereof from the view of the posing subject, and additional walls cooperating with the first-mentioned walls and the camera to cut off passage of light from behind said reflector past the camera to the subject.

5. Pose reflecting photographic apparatus comprising, in combination, a portable cabinet structure generically of customary design, a camera located therein, a light-transmitting reflector located between said camera and a posing position in front of the apparatus to permit a subject to view his reflected image directly therein and movably mounted in said structure so that its reflecting surface may be turned to the right and left, a plurality of mirrors mounted in said structure on opposite sides of a path of light from the posing position to said camera to cooperate with said reflector when turned to the right or left to permit the subject to view his reflected image in the latter indirectly through said mirrors, a forwardly facing wall constituting a part of said structure, a plurality of lights of selectively varied intensity located in segregating recesses partitioned from each other behind said wall, translucent panels covering the recesses arranged to transmit light from the plurality of lights to the posing position so as to illuminate a posing subject in front of the reflector; said structure having walls so positioned with respect to the edges of said movable reflector as to cooperate therewith and the lights in effectively concealing said camera and parts thereof from the view of the posing subject, and additional walls cooperating with the first-mentioned walls and the camera to cut off passage of light from behind said reflector past the camera to the subject.

6. Pose reflecting photographic apparatus comprising, in combination, a cabinet structure, a camera located in said cabinet structure, a transparent reflector mounted in said structure between said camera and a posing position in front of the apparatus, said structure having a forwardly facing wall, illuminating means behind said wall, translucent panels in said wall between said illuminating means and the posing position to transmit light from the illuminating means to a posing subject so as to illuminate a posing subject, said structure also having wall portions arranged to cut off passage of light from behind the reflector to the subject, and said panels being so juxtaposed with respect to said reflector as to aid in preventing the posing subject from seeing therethrough.

7. In photographic apparatus permitting a person to be photographed with the camera hidden from view and permitting the said person to observe by mirror means his pose as seen from the camera, the combination comprising a camera and means for screening the camera from view to prevent the person being photographed from seeing the camera or parts thereof which would otherwise render or have a tendency to render the person camera-conscious, the said means including a light-transmitting screen having a reflecting material forming a partly-transparent mirror, the said screen being positioned between the person to be photographed and the camera lens and having sufficient area to permit the person to observe his image.

8. In photographic apparatus permitting a person to be photographed with the camera hidden from view and permitting said person to observe by mirror means his pose to be photographed by the camera, the combination comprising a camera and partially-reflecting mirror means having a reflecting metal deposited thereon and positioned in the path of the light which is to give rise to the picture, said metal being disposed over a portion of the surface of said mirror means, said portion being of sufficient size to permit an image reflected from said metal to be clearly visible at a substantial distance therefrom, said mirror means being adapted to transmit a greater amount of light than it reflects, said mirror means being so oriented that said metal does not reflect into said picture-taking means light which passes from the sitter to said metal, the surface of said mirror means being substantially perpendicular to the light path.

9. In photographic apparatus permitting a person to be photographed with the camera hidden from view and permitting said person to observe by mirror means his pose as seen from the camera, the combination comprising a camera and means for screening the camera from view to prevent the person being photographed from seeing the camera or parts thereof which would tend to render the person camera-conscious, the said means comprising a light-transmitting screen having a reflecting material on the surface thereof forming a partly-transparent mirror surface, the said screen being positioned between the person to be photographed and the camera and having a sufficient area to permit the person to observe his image in the said mirror surface.

10. In photographic apparatus permitting a person to be photographed with the camera hidden from view and permitting the said person to observe by mirror means his pose to be photographed by the camera, the combination comprising a camera and means for screening the camera from view to prevent the person being photographed from seeing the camera, the said screening means consisting of a light-transmitting screen having a reflecting material forming a partly-transparent mirror, the said screen being positioned between the person to be photographed and the camera so as to permit the person photographed to see his image therein, the said screen being of sufficient area and so positioned as to hide the camera from the view of the said person whether the screen is viewed directly, or indirectly through other mirrors.

11. In photographic apparatus permitting a person to be photographed with the camera hidden from view and permitting the said person to observe by mirror means his pose to be photographed by the camera, the combination comprising a camera and means for screening the camera from view to prevent the person being photographed from seeing the camera, the said screening means consisting of a light-transmitting screen having a reflecting material forming a partly-transparent mirror, the said screen being adapted to be so positioned between the person to be photographed and the camera as to permit the person photographed to see his image therein, either directly, or indirectly through other mirrors, the said screen being of sufficient area and so positioned as to hide the camera from the view of the said person whether the screen is viewed directly, or indirectly through other mirrors.

12. In a photographic apparatus permitting a person to be photographed with the camera hidden from view and permitting the said person to observe by mirror means his pose as it would appear in the photograph, the combination comprising a camera and a light-transmitting, partially-reflecting screen, the said screen being so positioned between the person to be photographed and the camera as to permit the person photographed to see his image in said partially-reflecting screen, the said screen being of sufficient area and so positioned as to hide the camera from the view of the said person whether the screen is viewed directly, or indirectly through other mirrors, said screen having a reflecting metal deposited thereon.

13. In a photographic apparatus permitting a person to be photographed with the camera hidden from view and permitting the said person to observe by mirror means his pose as it would appear in the photograph, the combination comprising a camera and a light-transmitting, partially-reflecting screen having a reflecting metal deposited thereon, the said screen being of sufficient area and so positioned between the person to be photographed and the camera as to permit the person photographed to see his image therein, the said metal being deposited over a portion of the surface of the screen, said portion being of sufficient size to permit an image reflected from said metal to be clearly visible at a substantial distance from the screen, said screen being so positioned in the path of the light which is to give rise to the photograph as to hide the camera from the view of the said person whether the screen is viewed directly, or indirectly through other mirrors.

14. In a photographic apparatus permitting a person to be photographed with the camera hidden from view and permitting the said person to observe by mirror means his pose as it would appear in the photograph, the combination comprising a camera and a light-transmitting, partially-reflecting screen having a reflecting metal deposited thereon, said screen being adapted for positioning in the path of light from the person to the camera and being of sufficient area to hide the camera from the said person's view, said metal being deposited over a portion of the surface of said screen, said portion being of sufficient size to permit an image reflected from said metal to be clearly visible at a substantial distance therefrom, said screen being adapted to transmit a greater amount of light than it reflects, the screen being so oriented that the metal does not reflect into the camera light which passes from the said person to the said reflecting metal.

15. In photographic apparatus permitting a person to be photographed with the camera hidden from view and permitting the said person to observe by mirror means his pose to be photographed, the combination comprising a camera, means for screening the camera from view to prevent the person being photographed from seeing the camera or parts thereof which would otherwise render or have a tendency to render the person camera-conscious, the said means including a light-transmitting screen having a reflecting material distributed so as to form a partly-transparent mirror, the said screen being positioned between the person to be photographed and the camera lens and having a sufficient area to permit the person to observe his image therein and a mirror so positioned with relation to the said person and the said light-transmitting screen as to permit the said person to observe his image in the said mirror when the person is in a pose for obtaining a profile or part profile view.

ROBERT B. WHEELAN.